United States Patent
Kwak et al.

(10) Patent No.: US 8,781,628 B2
(45) Date of Patent: Jul. 15, 2014

(54) WALKING ROBOT AND CONTROL METHOD THEREOF

(75) Inventors: Ho Seong Kwak, Seoul (KR); Jeong Heon Han, Seoul (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 303 days.

(21) Appl. No.: 13/210,466

(22) Filed: Aug. 16, 2011

(65) Prior Publication Data

US 2012/0046789 A1  Feb. 23, 2012

(30) Foreign Application Priority Data

Aug. 17, 2010 (KR) .................. 10-2010-0079428

(51) Int. Cl.
G05B 19/00 (2006.01)

(52) U.S. Cl.
USPC .......... 700/258; 700/245; 700/249; 700/250; 700/253; 700/254; 318/568.12

(58) Field of Classification Search
None
See application file for complete search history.

(56) References Cited

U.S. PATENT DOCUMENTS

| | | | | |
|---|---|---|---|---|
| 5,056,038 A * | 10/1991 | Kuno et al. | | 700/260 |
| 5,355,064 A * | 10/1994 | Yoshino et al. | | 318/568.12 |
| 5,459,659 A * | 10/1995 | Takenaka | | 700/260 |
| 6,962,220 B2 * | 11/2005 | Takenaka et al. | | 180/8.6 |
| 7,053,579 B2 * | 5/2006 | Moridaira | | 318/568.12 |
| 7,072,740 B2 * | 7/2006 | Iribe et al. | | 700/245 |
| 7,184,858 B2 * | 2/2007 | Okazaki et al. | | 700/254 |
| 7,236,852 B2 * | 6/2007 | Moridaira et al. | | 700/245 |
| 7,260,450 B2 * | 8/2007 | Okazaki et al. | | 700/254 |
| 7,313,463 B2 * | 12/2007 | Herr et al. | | 700/245 |
| 7,366,587 B2 * | 4/2008 | Iribe et al. | | 700/245 |
| 7,657,345 B2 * | 2/2010 | Endo et al. | | 700/249 |
| 7,949,428 B2 * | 5/2011 | Endo et al. | | 700/245 |
| 8,155,790 B2 * | 4/2012 | Oga et al. | | 700/261 |
| 8,340,822 B2 * | 12/2012 | Nagasaka | | 700/260 |
| 8,417,382 B2 * | 4/2013 | Yoshiike et al. | | 700/253 |
| 8,419,804 B2 * | 4/2013 | Herr et al. | | 623/24 |
| 8,463,433 B2 * | 6/2013 | Nagasaka | | 700/245 |
| 2004/0176875 A1 * | 9/2004 | Iribe et al. | | 700/245 |
| 2004/0205417 A1 * | 10/2004 | Moridaira et al. | | 714/48 |
| 2005/0113973 A1 * | 5/2005 | Endo et al. | | 700/245 |
| 2006/0033462 A1 * | 2/2006 | Moridaira | | 318/568.12 |
| 2006/0071625 A1 * | 4/2006 | Nakata et al. | | 318/568.12 |
| 2006/0184276 A1 * | 8/2006 | Takenaka et al. | | 700/245 |
| 2007/0016329 A1 * | 1/2007 | Herr et al. | | 700/250 |
| 2007/0220637 A1 * | 9/2007 | Endo et al. | | 901/2 |
| 2009/0105878 A1 * | 4/2009 | Nagasaka | | 700/245 |
| 2009/0272585 A1 * | 11/2009 | Nagasaka | | 180/8.6 |
| 2010/0161116 A1 * | 6/2010 | Kwak et al. | | 700/245 |
| 2010/0185330 A1 * | 7/2010 | Kwon | | 700/261 |
| 2010/0324699 A1 * | 12/2010 | Herr et al. | | 623/27 |
| 2012/0046789 A1 * | 2/2012 | Kwak et al. | | 700/258 |
| 2012/0059518 A1 * | 3/2012 | Lee et al. | | 700/261 |

* cited by examiner

*Primary Examiner* — Khoi Tran
*Assistant Examiner* — Jonathan L Sample
(74) *Attorney, Agent, or Firm* — Staas & Halsey LLP

(57) ABSTRACT

A torque-based walking robot and a control method thereof which stably controls walking of the robot. In the control method, in which high rigidity, equal to that achieved through a position-based control method, is achieved using a torque-based control method without switching between the position-based control method and the torque-based control method while the robot is in motion, a difference between a target torque and a measured torque is forcibly generated by limiting a torque range measurable by each torque sensor, thereby increasing voltage applied to each actuator, and thus achieving high rigidity, equal to that achieved through the position-based control method, using the torque-based control method without switching between the position-based control method and the torque-based control method.

13 Claims, 7 Drawing Sheets

WALKING ROBOT AND CONTROL METHOD THEREOF

CROSS-REFERENCE TO RELATED APPLICATIONS

This application claims the benefit of Korean Patent Application No. 2010-0079428, filed on Aug. 17, 2010 in the Korean Intellectual Property Office, the disclosure of which is incorporated herein by reference.

BACKGROUND

1. Field

Embodiments relate to a torque-based walking robot and a control method thereof.

2. Description of the Related Art

Recently, research and development of walking robots which have a similar joint system to that of humans and are designed to coexist with humans in human working and living spaces has been vigorously progressing. The walking robots include multi-legged walking robots having a plurality of legs, such as bipedal or tripedal walking robots, and in order to achieve stable walking of the robots, actuators, such as electric actuators and hydraulic actuators, located at respective joints need to be driven. Driving of actuators is generally divided into a position-based Zero Moment Point (ZMP) control method in which command angles, i.e., command positions, of respective joints are given and the joints are controlled so as to trace the command angles, and a torque-based Finite State Machine (FSM) control method in which command torques of respective joints are given and the joints are controlled so as to trace the command torques.

In the ZMP control method, a walking direction, a walking stride, and a walking velocity of a robot are set in advance so as to satisfy a ZMP constraint, i.e., a condition that a ZMP is present in a safety region within a support polygon formed by (a) supporting leg(s) (if the robot is supported by one leg, meaning the region of the leg, and if the robot is supported by two legs, means a region set to have a small area within a convex polygon including the regions of the two legs in consideration of safety), walking patterns of the respective legs corresponding to the set factors are created, and walking trajectories of the respective legs are calculated based on the walking patterns. Further, angles of joints of the respective legs are calculated through inverse kinematic calculation of the calculated walking trajectories, and target control values of the respective joints are calculated based on current angles and target angles of the respective joints. Further, servo control in which the respective legs trace the calculated walking trajectories per control time is achieved. That is, during walking, whether or not positions of the respective legs precisely trace the walking trajectories according to the walking patterns is detected, and if the respective legs are deviated from the walking trajectories, torques of actuators are adjusted so that the respective legs precisely trace the walking trajectories. Such a ZMP control method is a position-based control method and thus achieves precise position control, but requires precise angle control of the respective joints in order to control the ZMP and thus requires a high servo gain. Thereby, the ZMP control method requires high current, thus having low energy efficiency and high rigidity of the joints.

On the other hand, in the FSM control method, rather than tracing positions per control time, finite operating states of a robot are defined in advance, target torques of respective joints are calculated with reference to the respective operating states during walking, and the joints are controlled so as to trace the target torques. Such an FSM control method controls torques of the respective joints during walking and thus enables a low servo gain, thereby having high energy efficiency and low rigidity. Further, the FSM control method does not need to avoid kinematic singularities, thereby allowing the robot to have a more natural gait similar to that of a human.

While a robot is in motion, switching between the above-described position-based ZMP control method and torque-based FSM control method may be required. However, if switching between the control methods occurs while the robot is in motion, a current and voltage spike may occur. Due to such a current and voltage spike, sensors obtain unstable data, and thus control may be unstable and hardware may be damaged.

SUMMARY

Therefore, it is an aspect of one or more embodiments to provide a walking robot and a control method thereof in which high rigidity, equal to that achieved through position-based control, is achieved while maintaining a single torque-based control method.

Additional aspects of embodiments will be set forth in part in the description which follows and, in part, will be obvious from the description, or may be learned by practice of the embodiments.

In accordance with an aspect of one or more embodiments, a control method of a torque-based walking robot includes measuring a torque of each actuator through each torque sensor, calculating a target torque of each actuator, setting a specific value added to the torque measured by each torque sensor, adding the set specific value to the torque measured by each torque sensor, and calculating a voltage being higher than a voltage, when the specific value is not used, through control using a torque, obtained by adding the set specific value to the torque measured by each torque sensor, and the target torque, and applying the calculated voltage to each actuator.

The setting of the specific value may include limiting a torque range measurable by each torque sensor and setting a difference between the torque measured by each torque sensor having the limited measurement torque range and the target torque to the specific value.

The limitation of the torque range may be achieved by setting a maximum value and a minimum value of the torque range measurable by each torque sensor.

The voltage applied to each actuator may be controlled by adjusting the specific value by adjusting the maximum value and the minimum value of the torque range.

The calculation of the target torque may include calculating a difference between a target angle of an encoder and an actual angle of the encoder and minimizing the difference therebetween.

The waking robot may be controlled by combination of proportional gain control, integral gain control, and differential gain control.

In accordance with another aspect of one or more embodiments, a walking robot having multiple legs includes torque sensors to measure torques of respective actuators, and a control unit to calculate a target torque of each actuator, to calculate a voltage applied to each actuator through control using a torque of each actuator measured by each torque sensor and the target torque, and to apply the calculated voltage to each actuator so as to adjust rigidity of the robot.

The voltage applied to each actuator may be calculated by setting a specific value added to the torque measured by each torque sensor, adding the set specific value to the torque measured by each torque sensor, and achieving control using a torque, obtained by adding the set specific value to the torque measured by each torque sensor, and the target torque, and the voltage applied to each actuator may be higher than a voltage when the specific value is not used.

The specific value may be obtained by limiting a torque range measurable by each torque sensor through the control unit and setting a difference between the torque measured by each torque sensor having the limited measurement torque range and the target torque to the specific value.

The limitation of the torque range may be achieved by setting a maximum value and a minimum value of the torque range measurable by each torque sensor.

The target torque may be obtained by calculating a difference between a target angle of an encoder and an actual angle of the encoder and minimizing the difference therebetween.

The control unit may control walking of the robot by combination of proportional gain control, integral gain control, and differential gain control.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
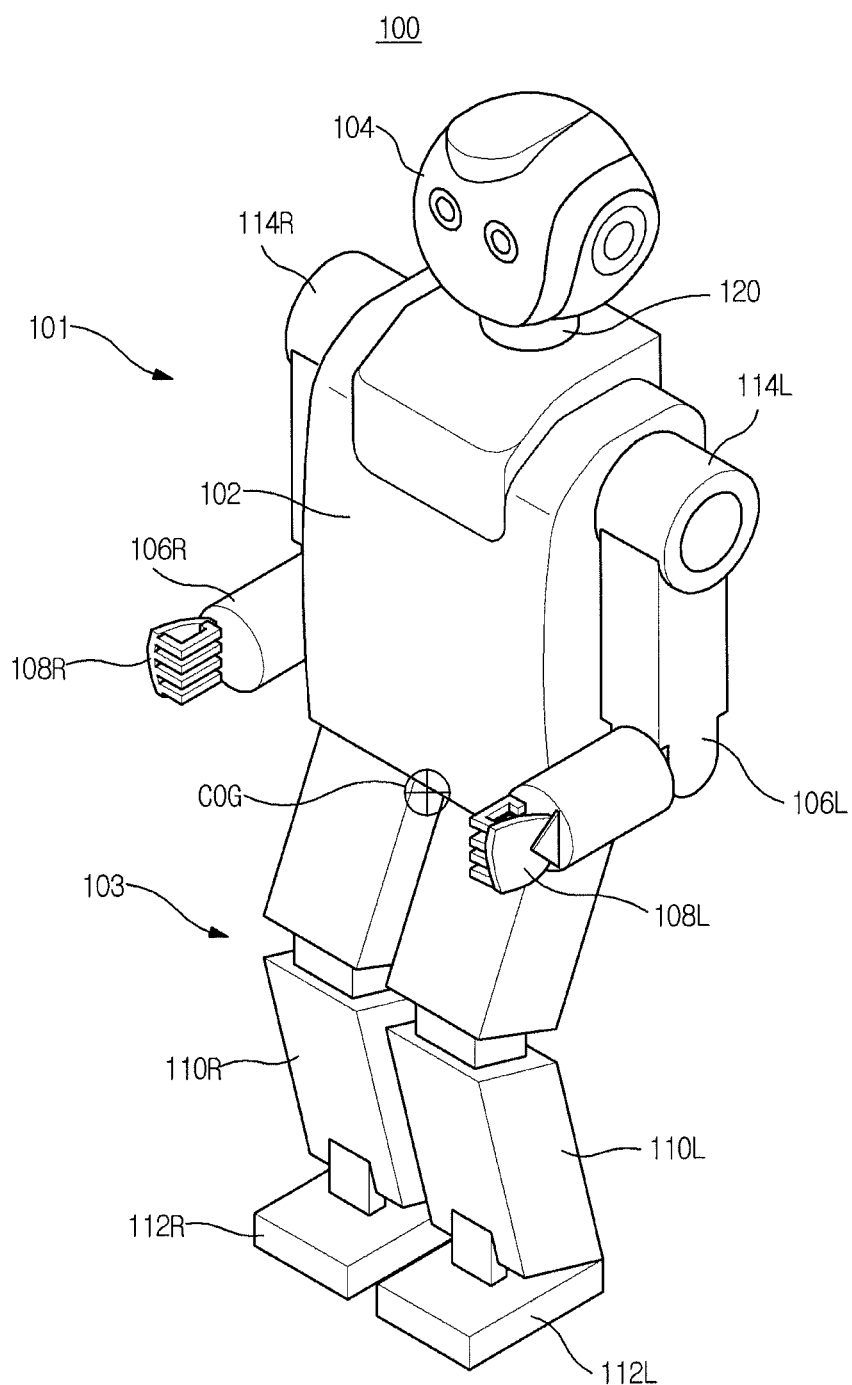
FIG. 1 is a view illustrating an external appearance of a robot in accordance with an embodiment.

Reference will now be made in detail to embodiments, examples of which are illustrated in the accompanying drawings, wherein like reference numerals refer to like elements throughout.

Hereinafter, among multi-legged walking robots, a bipedal walking robot will be exemplarily described.

FIG. 1 is a view illustrating an external appearance of a robot in accordance with an embodiment.

As shown in FIG. 1, a robot 100 in accordance with an embodiment is a bipedal walking robot, which walks upright using two legs 110 in the same manner as a human, and includes an upper body 101 including a torso 102, a head 104, and arms 106, and a lower body 103 including the two legs 110.

The upper body 101 of the robot 100 includes the torso 102, the head 104 connected to the upper portion of the torso 102 through a neck 120, the two arms 106L and 106R connected to both sides of the upper portion of the torso 102 through shoulders 114L and 114R, and hands 108L and 108R respectively connected to tips of the two arms 106L and 106R.

The lower body 103 of the robot 100 includes the two legs 110L and 110R connected to both sides of the lower portion of the torso 102 of the upper body 101, and feet 112L and 112R respectively connected to tips of the two legs 110L and 110R.

Here, "R" and "L" respectively indicate the right and left sides of the robot 100, and COG indicates the center of gravity of the robot 100.

Figure 2:
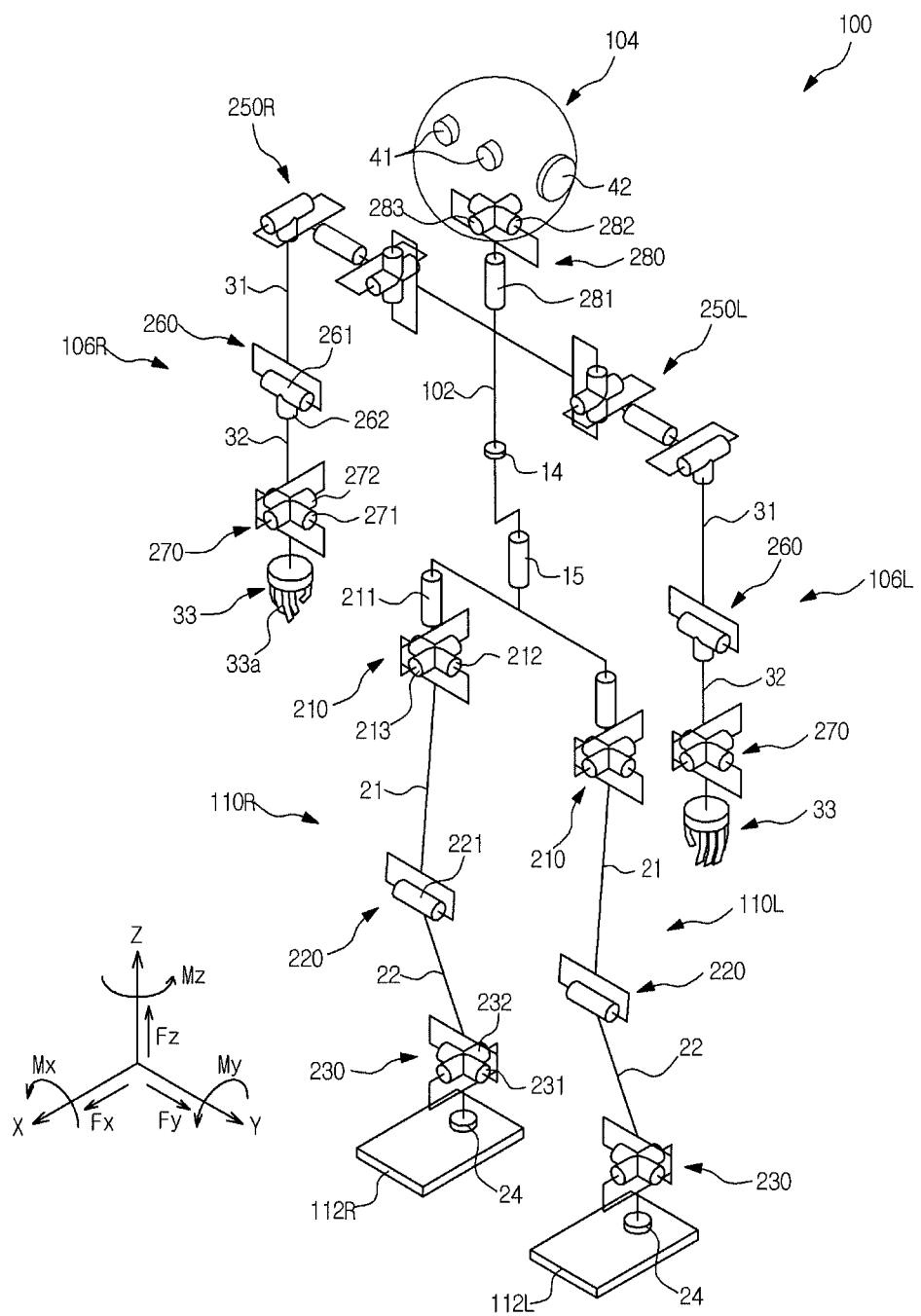
FIG. 2 is a view illustrating structures of main joints of the robot of FIG. 1.

FIG. 2 is a view illustrating structures of main joints of the robot of FIG. 1.

As shown in FIG. 2, a pose sensor 14 is installed on the torso 102 of the robot 100. The pose sensor 14 detects a tilt angle of the upper body 101, i.e., an inclination of the upper body 101 relative to a vertical axis, and an angular velocity thereof, and generates pose data. The pose sensor 14 may be installed on the head 104 as well as the torso 102.

A joint unit 15 having 1 degree of freedom in the yaw direction so as to rotate the torso 101 is installed on the torso 102.

Further, cameras 41 to capture surrounding images and microphones 42 to input user's voice are installed on the head 104 of the robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis), and a rotary joint 283 in the roll direction (rotated around the X-axis), and thus has 3 degrees of freedom.

Motors (for example, actuators, such as electric motors or hydraulic motors) to rotate the head 104 are connected to the respective rotary joints 281, 282, and 283 of the neck joint unit 280.

The two arms 106L and 106R of the robot 100 respectively have upper arm links 31, lower arm links 32, and the hands 108L and 108R.

The upper arm links 31 are connected to the upper body 101 through shoulder joint units 250L and 250R, the upper arm links 31 and the lower arm links 32 are connected to each other through elbow joint units 260, and the lower arm links 32 and the hands 108L and 108R are connected to each other by wrist joint units 270.

The shoulder joint units 250L and 250R are installed at both sides of the torso 102 of the upper body 101, and connect the two arms 106L and 106R to the torso 102 of the upper body 101.

Each elbow joint unit 260 has a rotary joint 261 in the pitch direction and a rotary joint 262 in the yaw direction, and thus has 2 degrees of freedom.

Each wrist joint unit 270 has a rotary joint 271 in the pitch direction and a rotary joint 272 in the roll direction, and thus has 2 degrees of freedom.

Each hand 108L or 108R is provided with five fingers 33a. A plurality of joints (not shown) driven by motors may be installed on the respective fingers 33a. The fingers 33a perform various motions, such as gripping of an article or pointing in a specific direction, in connection with movement of the arms 106.

The two legs 110L and 110R respectively have thigh links 21, calf links 22, and the feet 112L and 112R.

The thigh links 21 correspond to thighs of a human and are connected to the torso 102 of the upper body 101 through hip joint units 210, the thigh links 21 and the calf links 22 are connected to each other by knee joint units 220, and the calf links 22 and the feet 112L and 112R are connected to each other by ankle joint units 230.

Each hip joint unit 210 has a rotary joint (hip yaw joint) 211 in the yaw direction (rotated around the Z-axis), a rotary joint (hip pitch joint) 212 in the pitch direction (rotated around the Y-axis), and a rotary joint (hip roll joint) 213 in the roll direction (rotated around the X-axis), and thus has 3 degrees of freedom.

Each knee joint unit 220 has a rotary joint 221 in the pitch direction, and thus has 1 degree of freedom.

Each ankle joint unit 230 has a rotary joint 231 in the pitch direction and a rotary joint 232 in the roll direction, and thus has 2 degrees of freedom.

Since six rotary joints of the hip joint unit 210, the knee joint unit 220, and the ankle joint unit 230 are provided on each of the two legs 110L and 110R, a total of twelve rotary joints is provided to the two legs 110L and 110R.

Further, multi-axis force and torque (F/T) sensors 24 are respectively installed between the feet 112L and 112R and the ankle joint units 230 of the two legs 110L and 110R. The multi-axis F/T sensors 24 measure three-directional components Fx, Fy, and Fz of force and three-directional components Mx, My, and Mz of moment transmitted from the feet 112L and 112R, thereby detecting whether or not the feet 112L and 112R touch the ground and load applied to the feet 112L and 112R.

Although not shown in the drawings, actuators, such as motors, to drive the respective rotary joints are installed on the robot 100. A control unit to control the overall operation of the robot 100 properly controls the motors, thereby allowing the robot 100 to achieve various actions.

Figure 3:
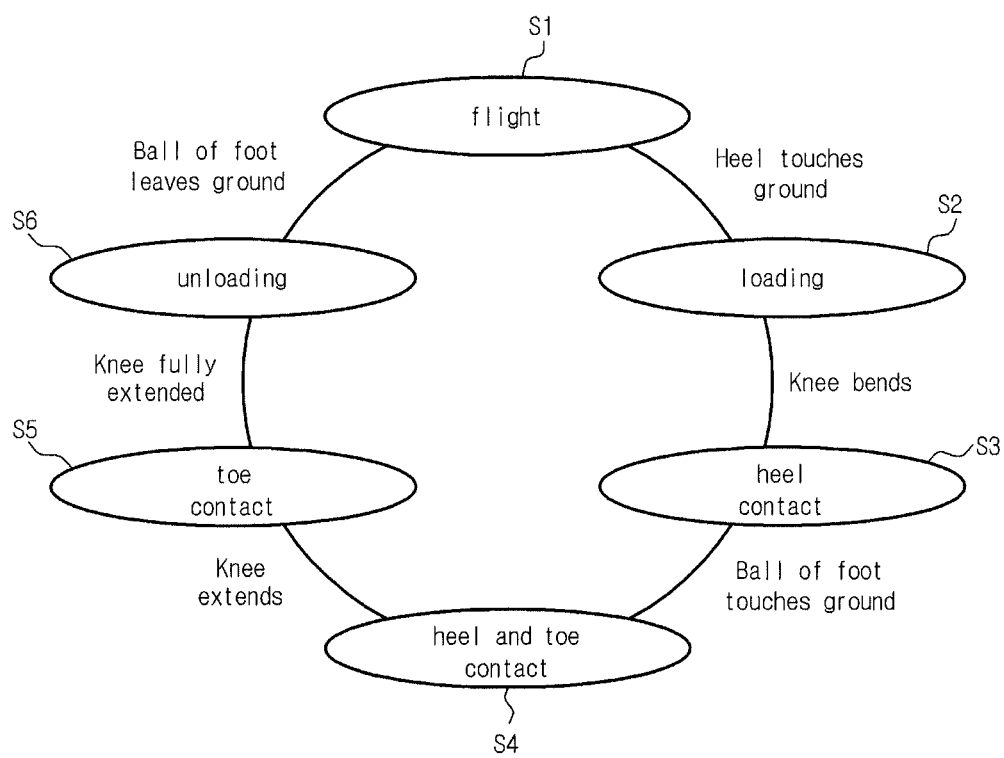
FIG. 3 is a view illustrating operating states of the robot and control actions of the respective operating states, while the robot in accordance with an embodiment walks based on an FSM.

FIG. 3 is a view illustrating operating states of the robot and control actions of the respective operating states, while the robot in accordance with an embodiment walks based on an FSM.

With reference to FIG. 3, in the torque-based FSM control method, operation of the robot 100 is divided into a plurality of operating states (for example, six (6) states of S1, S2, S3, S4, S5, and S6), which are defined in advance. The respective operating states S1, S2, S3, S4, S5, and S6 means poses of one leg 110L or 110R of the robot 100 during walking, and stable walking of the robot 100 is achieved by proper transition between such poses of the robot 100.

The first operating state (flight state) S1 corresponds to a pose of swinging the leg 110L or 110R, the second operating state (loading state) S2 corresponds to a pose of loading the foot 112 on the ground, the third operating state (heel contact state) S3 corresponds to a pose of bringing the heel of the foot 112 into contact with the ground, the fourth operating state (heel and toe contact state) S4 corresponds to a pose of bringing both the heel and the toe of the foot 112 into contact with the ground, the fifth operating state (toe contact state) S5 corresponds to a pose of bringing the toe of the foot 112 into contact with the ground, and the sixth operating state (unloading state) S6 corresponds to a pose of unloading the foot 112 from the ground.

In order to transition from one operating state to another operating state, a control action to achieve the transition is required.

In more detail, if the first operating state S1 transitions to the second operating state S2 (S1→S2), a control action in which the heel of the foot 112 touches the ground is required.

If the second operating state S2 transitions to the third operating state S3 (S2→S3), a control action in which the knee (particularly, the knee joint unit) of the foot 112 touching the ground bends is required.

If the third operating state S3 transitions to the fourth operating state S4 (S3→S4), a control action in which the toe of the foot 112 touches the ground is required.

If the fourth operating state S4 transitions to the fifth operating state S5 (S4→S5), a control action in which the knee of the foot 112 touching the ground extends is required.

If the fifth operating state S5 transitions to the sixth operating state S6 (S4→S5), a control action in which the knee of the foot 112 touching the ground fully extends is required.

If the sixth operating state S6 transitions to the first operating state S1 (S6→S1), a control action in which the toe of the foot 112 leaves the ground is required.

Therefore, in order to perform the control actions, the robot 100 calculates torque commands of the respective joints corresponding to the respective control actions, and outputs the calculated torque commands to the actuators, such as the motors, installed on the respective joints to drive the actuators.

In such a torque-based FSM control method, walking of the robot 100 is controlled depending on the previously defined operating states S1, S2, S3, S4, S5, and S6.

Figure 4:
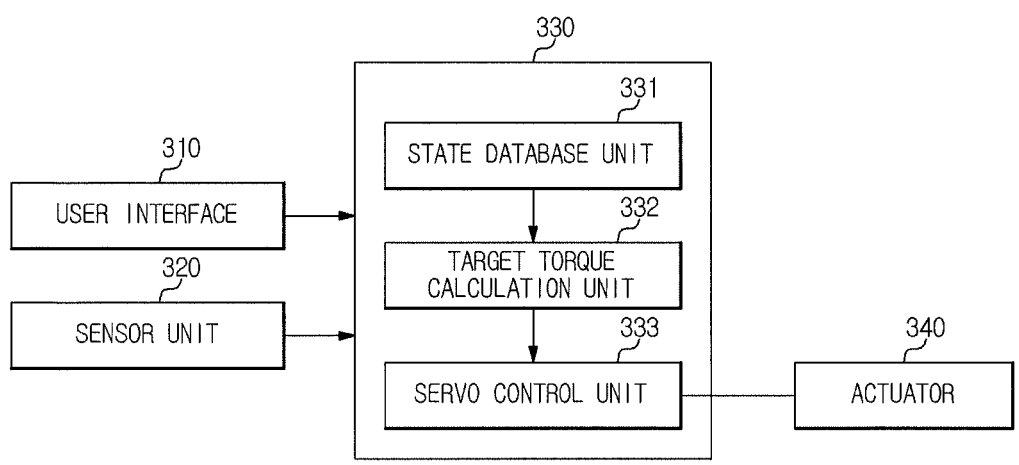
FIG. 4 is a walking control block diagram of the robot in accordance with an embodiment.

FIG. 4 is a walking control block diagram of the robot in accordance with an embodiment. The robot 100 in accordance with an embodiment includes a user interface unit 310, a sensor unit 320, a walking control unit 330, and actuators 340.

The user interface unit 310 is used to input a user command to instruct the robot 100 to walk. The sensor unit 320 includes the pose sensor 14 installed on the torso 102 of the robot 100 to detect an inclination or a pose of the upper body 102, the F/T sensors 24 installed between the feet 112 and the ankle joint units 230 of the robot 100 to detect whether or not the feet 112L and 112R touch the ground, and torque sensors to detect torques of the respective actuators.

The walking control unit 330 is a Proportional Integral Derivative (PID) controller to control walking of the robot 100 based on the walking command input from the user interface unit 310 and sensor data detected by the sensor unit 320, and includes a state database unit 331, a target torque calculation unit 332, and a servo control unit 333.

The state database unit 331 stores leg state data of the robot 100 based on the FSM (Finite State Machine), and operating state data of the respective joint units 15 and 210 corresponding to leg states of the robot 100.

Here, the FSM sequentially represents transitions of finite operating states of the torso 102 and the legs 110L and 110R. The finite operating states of the legs 110L and 110R are determined by whether or not which foot 112L or 112R is in a stance state or a swing state.

The target torque calculation unit 332 calculates target torques, which the respective actuators need to trace, through a calculating process of Expression 1 below using PID control.

$$\tau_d = k_{p1}(e_p) + k_{d1}(e_v) + k_{i1}\int e_p dt \qquad \text{[Expression 1]}$$

In Expression 1, $\tau_d$ is a target torque, $k_{p1}$ is a P gain in PID control, $k_{d1}$ is a D gain in PID control, and $k_{i1}$ is an I gain in PID control. Further, $e_p$ is an encoder error, i.e., a difference between a target encoder angle and an actual encoder angle, and $e_v$ is a difference between a target encoder angular velocity obtained by differentiating the target encoder angle and an actual encoder angular velocity obtained by differentiating the actual encoder angle.

The servo control unit 333 calculates voltages applied to the respective actuators through Expression 2 below using PI control.

$$V = k_{p2}(e_t) + k_{i2}\int e_t dt \qquad \text{[Expression 2]}$$

$$e_t = \tau_d - \tau$$

In Expression 2, V is a voltage applied to the actuator, $k_{p2}$ is a P gain in PI control, and $k_{i2}$ is an I gain in PI control. Further, $e_t$ is a torque error, i.e., a difference between a target torque $\tau_d$ calculated by the target torque calculation unit 332 and an actual torque T of each actuator measured by the torque sensor.

The torque-based FSM control method controls torques of the respective joints during walking of the robot 100 and thus has a low servo gain, thereby having high energy efficiency but having low rigidity. The walking control unit 330 in accordance with this embodiment provides a control method in which high rigidity, equal to that achieved through position-based control, is achieved through torque torque-based FSM control.

The servo control unit 333 forcibly generates a torque error and thus increases the voltages applied to the actuators, thereby achieving high rigidity, equal to that achieved through the position-based control method.

Hereinafter, this will be described in more detail.

Figure 5A:
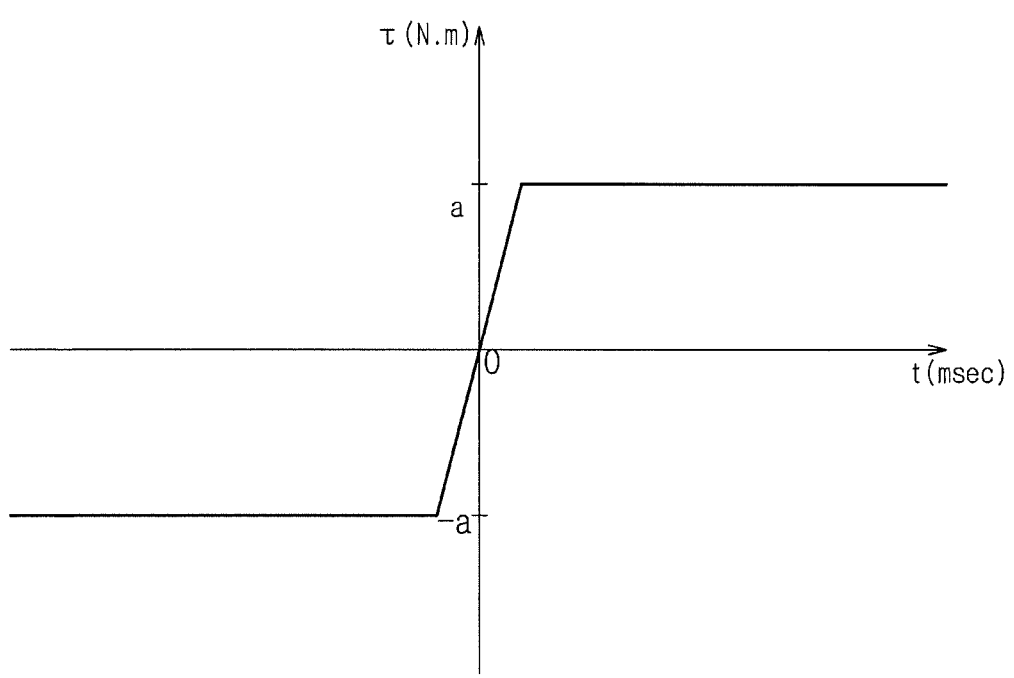
FIG. 5A is a graph representing a limited measurement range of a torque sensor in accordance with an embodiment.
Figure 5B:
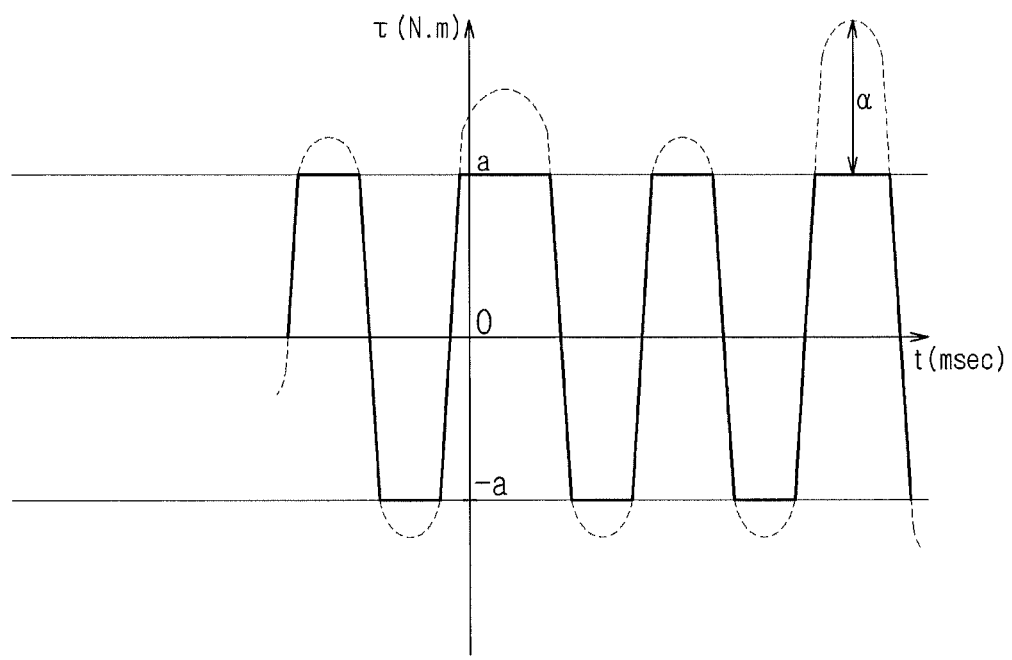
FIG. 5B is a graph illustrating a difference between a torque measured by the torque sensor of FIG. 5A in accordance with an embodiment and a target torque.

FIG. 5A is a graph representing a limited measurement range of the torque sensor in accordance with an embodiment, and FIG. 5B is a graph illustrating a difference between a torque measured by the torque sensor of FIG. 5A and a target torque. In FIG. 5B, a dotted line represents the target torque, and a solid line represents the torque measured by the torque sensor of FIG. 5A having the limited measurement range.

The servo control unit 333 sets a maximum value and a minimum value of a torque range measurable by the torque sensor, and allows a torque more than the maximum value to be measured as the set maximum value and a torque less than the minimum value to be measured as the set minimum value. Hereinafter, the absolute value of the maximum and minimum values is referred to as 'a' (with reference to FIG. 5A). If the target torque exceeds the limited range of the torque sensor, there is a difference between the target torque and the torque measured by the torque sensor (with reference to FIG. 5B). Hereinafter, the difference between the target torque and the torque measured by the torque sensor is referred to as 'a'.

Instead of the actual torque T of each actuator, represented in Expression 2, the servo control unit 333 uses data obtained by adding the difference α between the target torque and the measured torque of the torque sensor, generated by the limitation of the measurement range of the torque sensor, to the torque (hereinafter, referred to $\tau_a$) measured by the torque sensor having the limited measurement range. Therefore, Expression 2 is transformed into Expression 3 below.

$$V = k_{p2}(\tau_d - (\tau_a + \alpha)) + k_{i2}\int (\tau_d - (\tau_a + \alpha))dt \quad \text{[Expression 3]}$$

$$= k_{p2}(\tau_d - \tau_a) + k_{i2}\int (\tau_d - \tau_d)dt - k_{p2}\alpha -$$

$$k_{i2}\int (\alpha)dt$$

$$k_{p2}(\tau_d - \tau_a) + k_{i2}\int (\tau_d - \tau_d)dt \quad \text{[Expression 4]}$$

$$-k_{p2}\alpha - k_{i2}\int (\alpha)dt \quad \text{[Expression 5]}$$

The right side of Expression 3 is generally divided into a term indicating general PI control of the torque $\tau_a$ measured by the torque sensor, i.e., a term represented by Expression 4, and a term obtained by the difference between the measured torque and the target torque generated by the limitation of the measurement range of the torque sensor, i.e., a term represented by Expression 5.

Here, the term represented by Expression 5 functions as a voltage additionally applied to the actuator, thereby increasing rigidity of the actuator. That is, the additional voltage obtained by the difference between the measured torque and the target torque generated by the limitation of the measurement range of the torque sensor is added to a voltage applied in general torque control, i.e., the voltage corresponding to Expression 4, thereby increasing rigidity of the motor.

The servo control unit 333 controls the difference between the measured torque and the target torque by adjusting the maximum and minimum values of the measurement range of the torque sensor, thus controlling rigidity of the actuator.

Thereby, using the single torque-based control method alone, high rigidity, equal to that achieved through position-based control, may be achieved without switching between control methods.

Figure 6:
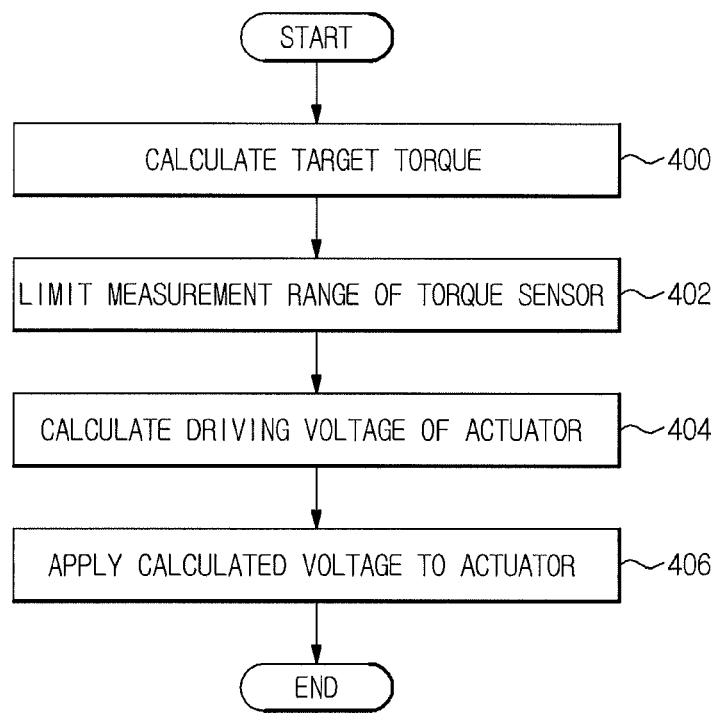
FIG. 6 is a flow chart illustrating a walking control method of the robot in accordance with an embodiment.

FIG. 6 is a flow chart illustrating a walking control method of the robot in accordance with an embodiment.

With reference to FIG. 6, the target torque calculation unit 332 of the walking control unit 330 calculates a target torque of each actuator through PID control to minimize an encoder error, i.e., a difference between a target encoder angle and an actual encoder angle (operation 400).

Thereafter, the servo control unit 333 sets a maximum value and a minimum value of a torque range measurable by the torque sensor, and allows a torque more than the maximum value to be measured as the maximum value and a torque less than the minimum value to be measured as the minimum value (operation 402).

Thereafter, the servo control unit 333 calculates a voltage applied to the actuator through PI control using data obtained by adding the difference α between the torque to Ta measured by the torque sensor having the limited measurement range and the target torque to the torque Ta measured by the torque sensor (operation 404). Such a calculated voltage is higher than a voltage calculated if the difference α is not applied, thereby increasing rigidity of the motor. That is, the above-described difference α is forcibly applied in a feedback manner, thereby generating an additional voltage.

Thereafter, the servo control unit 333 applies the calculated voltage to each actuator, thereby driving each joint (operation 406).

As is apparent from the above description, a walking robot and a control method thereof in accordance with an embodiment achieve high rigidity while maintaining a single torque-based control method, thereby preventing unstable control and hardware damage due to switching between control methods.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a torque-based walking robot having actuators and torque sensors, the method comprising:
    measuring a torque of each actuator of the robot through each torque sensor of the robot;
    calculating a target torque of each actuator;
    setting, in accordance with the calculated target torque of each actuator, a specific value to be added to the torque measured by each torque sensor, adding the set specific value to the torque measured by each torque sensor, and using the torque measured by each torque sensor and having the set specific value added thereto to calculate a voltage to be applied to each actuator to thereby control each actuator; and
    applying the calculated voltage to each actuator, wherein the setting of the specific value includes:
        limiting a torque range measurable by each torque sensor; and
        setting a difference between the torque measured by each torque sensor having the limited measurement torque range and the calculated target torque to the specific value.

2. The control method according to claim 1, wherein the limitation of the torque range is achieved by setting a maximum value and a minimum value of the torque range measurable by each torque sensor.

3. The control method according to claim 2, wherein the voltage applied to each actuator is controlled by adjusting the specific value by adjusting the maximum value and the minimum value of the torque range.

4. The control method according to claim 1, wherein the calculation of the target torque includes:
    calculating a difference between a target angle of an encoder and an actual angle of the encoder; and
    minimizing the difference therebetween.

5. The control method according to claim 1, wherein the waking robot is controlled by combination of proportional gain control, integral gain control, and differential gain control.

6. A walking robot comprising:
    torque sensors to measure torques of actuators of the robot; and
    a control unit to calculate a target torque of each actuator, to calculate a voltage to be applied to each actuator using the torque measured by the torque sensors and the calculated target torque, and to apply the calculated voltage to each actuator to thereby control each actuator, wherein
    the voltage applied to each actuator is calculated by
        setting, in accordance with the calculated torque of each actuator, a specific value to be added to the torque measured by the torque sensors,
        adding the set specific value to the measured torques, and
        using the measured torques having the set specific value added thereto to calculate said voltage, and
    the specific value is obtained by limiting a torque range measurable by each torque sensor through the control unit and setting a difference between the torque measured by each torque sensor having the limited measurement torque range and the target torque to the specific value.

7. The walking robot according to claim 6, wherein the limitation of the torque range is achieved by setting a maximum value and a minimum value of the torque range measurable by each torque sensor.

8. The walking robot according to claim 6, wherein the target torque is obtained by calculating a difference between a target angle of an encoder and an actual angle of the encoder and minimizing the difference therebetween.

9. The walking robot according to claim 6, wherein the control unit controls walking of the robot by combination of proportional gain control, integral gain control, and differential gain control.

10. A method comprising:
    setting, in accordance with a target torque, a specific value to be added to a measured torque of an actuator of a walking robot, adding the set specific value to measured torque, and using the measured torque having the set specific value added thereto to calculate a voltage to be applied to the actuator to control the actuator; and
    applying the calculated voltage to the actuator to thereby control the actuator, wherein
        the torque of the actuator is measured by a torque sensor, and
        the setting of the specific value includes limiting a torque range measurable by the torque sensor, and setting a difference between the torque measured by the torque sensor having the limited measurable torque range and the target torque to the specific value.

11. The method according to claim 10, wherein said setting, adding and using are performed by a computer.

12. The method according to claim 10, wherein the limitation of the torque range is achieved by setting a maximum value and a minimum value of the torque range measurable by the torque sensor.

13. The method according to claim 10, wherein the voltage, V, is calculated in accordance with the following expression:

$$V = k_{p2}(\tau_d - (\tau_a + \alpha)) + k_{i2} \int (\tau_d - (\tau_a + \alpha))dt$$

$$= k_{p2}(\tau_d - \tau_a) + k_{i2} \int (\tau_d - \tau_d)dt - k_{p2}\alpha - k_{i2} \int (\alpha)dt$$

where kp2 is a P gain in PI control, ki2 is an I gain in PI control, $\tau_d$ is the target torque, $\tau$ is the measured torque, $\tau_a$ is torque measured by a torque sensor having a limited measurement range, and $\alpha$ a difference between the target torque and the measured torque.

* * * * *